(12) United States Patent
Faler et al.

(10) Patent No.: US 8,528,368 B2
(45) Date of Patent: *Sep. 10, 2013

(54) METHODS AND SYSTEMS FOR PRODUCING A COATED OPTICAL FIBERS

(75) Inventors: James Henry Faler, Wilmington, NC (US); Andrey V. Filippov, Painted Post, NY (US); Bruce Warren Reding, Wilmington, NC (US); Bradley Kent Shepard, Wilmington, NC (US); David Andrew Tucker, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 626 days.

This patent is subject to a terminal disclaimer.

(21) Appl. No.: 12/268,033

(22) Filed: Nov. 10, 2008

(65) Prior Publication Data
US 2009/0158779 A1   Jun. 25, 2009

Related U.S. Application Data

(60) Provisional application No. 61/008,169, filed on Dec. 19, 2007.

(51) Int. Cl.
*C03B 37/01*   (2006.01)

(52) U.S. Cl.
USPC .............. 65/443; 65/435; 65/430; 65/533; 65/441

(58) Field of Classification Search
USPC ................. 65/435, 430, 441, 443, 533
See application file for complete search history.

(56) References Cited

U.S. PATENT DOCUMENTS

| | | | | |
|---|---|---|---|---|
| 6,565,775 | B2 * | 5/2003 | Dubois et al. | 264/1.24 |
| 2009/0139270 | A1 * | 6/2009 | Filippov et al. | 65/434 |
| 2010/0281922 | A1 * | 11/2010 | Costello et al. | 65/430 |

FOREIGN PATENT DOCUMENTS

| | | |
|---|---|---|
| JP | 59 146948 | 8/1984 |
| JP | 62 003037 | 1/1987 |
| JP | SHO62-3037 | 1/1987 |
| WO | WO2008/066661 | 6/2008 |

* cited by examiner

*Primary Examiner* — Queenie Dehghan
(74) *Attorney, Agent, or Firm* — Robert L. Carlson

(57) ABSTRACT

Methods for producing a coated optical fiber may include drawing an optical fiber from a draw furnace along a first pathway and redirecting the optical fiber along a second, different pathway which is non-parallel with the first pathway. The optical fiber may be coated as it travels along the second pathway.

14 Claims, 4 Drawing Sheets

METHODS AND SYSTEMS FOR PRODUCING A COATED OPTICAL FIBERS

CROSS-REFERENCE TO RELATED APPLICATIONS

This application claims the benefit of, and priority to U.S. Provisional Patent Application No. 61/008,169 filed on Dec. 19, 2007 entitled, "Methods and Systems For Producing Optical Fibers", the content of which is relied upon and incorporated herein by reference in its entirety.

BACKGROUND OF THE INVENTION

1. Field of the Invention

The present invention relates to methods and systems for producing coated optical fibers and, more specifically, to methods and systems for coating optical fibers along a non-vertical pathways.

2. Technical Background

Conventional techniques and manufacturing processes for producing optical fibers generally include drawing an optical fiber downwardly along a linear pathway through each stage of production. Accordingly, fiber production systems are generally oriented along a vertical pathway. Such systems present a significant impediment to improving and modifying the optical fiber manufacturing process. For example, the equipment associated with the vertically linear production of optical fiber is generally aligned in a top to bottom fashion thereby making it difficult to add components to the system or modify existing components without adding height to the overall system. In some cases, such as when the existing production system is at or near the ceiling of the existing facility, the addition of equipment and/or components to the linear production system necessitates additional construction to add height to the facility in order to accommodate the additional equipment and/or components. Further, interchanging and/or servicing vertically linear optical fiber production equipment may require the use of additional equipment such as scaffolds, lifts and the like. Such impediments result in significant additional costs when modifying, updating, and or repairing optical fiber production systems and facilities.

Providing systems and methods which allow an optical fiber manufacturer to utilize a non-linear system for producing optical fibers would significantly reduce the costs of implementing modifications, updates and repairs of the optical fiber manufacturing system. For example, an optical fiber production system in which a substantial portion of the system is oriented horizontally (as opposed to vertically) would facilitate the introduction of new equipment and the repair and updating of existing equipment in a more cost effective and efficient manner.

Accordingly a need exists for methods and systems of producing coated optical fibers in which at least a portion of the optical fiber production process is performed along a substantially horizontal pathway.

SUMMARY OF THE INVENTION

In one embodiment, a method for producing a coated optical fiber may include drawing an optical fiber from a draw furnace. The optical fiber may exit the draw furnace along a first pathway. The first pathway may be a substantially vertical pathway. Thereafter, the optical fiber can be redirected along a second, different pathway which is non-parallel with the first pathway. A fluid bearing may be used to redirect the optical fiber to the second pathway. The second pathway may be a substantially horizontal pathway. The optical fiber may be coated as it travels along the second pathway.

In another embodiment, a method for producing a coated optical fiber may include drawing an optical fiber from an optical fiber preform. The optical fiber may be drawn from the optical fiber preform along a substantially vertical pathway. After the optical fiber is drawn from the optical fiber preform, the optical fiber is redirected to a substantially horizontal pathway. While traveling along the substantially horizontal pathway, the optical fiber is passed through at least one coating die wherein a coating is applied to the optical fiber. The at least one coating die is oriented along the substantially horizontal pathway such that the optical fiber enters and exits the at least one coating die along the substantially horizontal pathway.

In yet another embodiment, a system for producing a coated optical fiber may include a draw furnace for heating an optical fiber preform such that an optical fiber may be drawn from the optical fiber preform. The draw furnace may be oriented such that the optical fiber drawn from the optical fiber preform exits the draw furnace along a substantially vertical pathway. The system may also include at least one coating die for applying a coating to an optical fiber. The coating die may be oriented along a substantially horizontal pathway such that an optical fiber enters and exits the coating die along the substantially horizontal pathway. At least one fluid bearing for redirecting an optical fiber from a first pathway to a second pathway may be disposed between the draw furnace and the at least one coating die. The at least one fluid bearing redirects the optical fiber from a first pathway to a substantially horizontal pathway and into the at least one coating die.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

DETAILED DESCRIPTION OF THE ILLUSTRATIVE EMBODIMENTS

Figure 1:
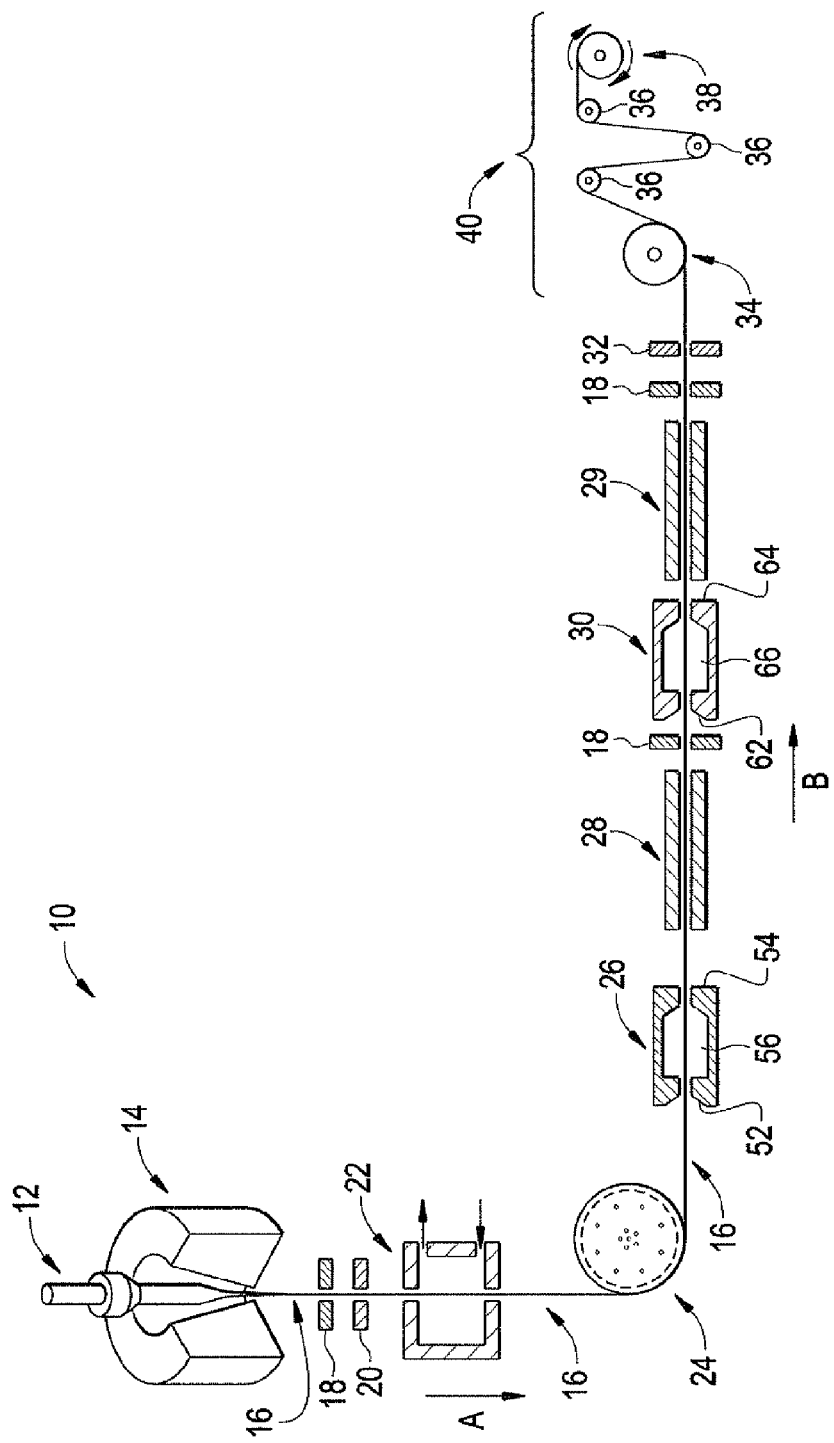
FIG. 1 is a schematic illustration of an optical fiber production system according to one or more embodiments shown and described herein.

The systems and methods described herein relate to the production of coated optical fibers in which a portion of the optical fiber manufacturing process is performed along a non-vertical pathway. More specifically, the systems and methods described herein relate to the production of coated optical fibers in which the optical fiber is coated along a substantially horizontal pathway. FIG. 1 illustrates one embodiment of a system for producing a coated optical fiber. The system generally comprises a draw furnace oriented along a first pathway, at least one coating die oriented along a second, different pathway, and at least one fluid bearing disposed between the draw furnace and the at least one coating die. Each of these elements will be described in more detail herein.

Referring to FIG. 1, one embodiment of a system 10 for producing coated optical fiber is illustrated. The system 10 may comprise a draw furnace 14 for heating an optical fiber preform 12 such that an optical fiber 16 may be drawn from the optical fiber preform 12. The preform 12 may comprise glass or any material suitable for the manufacture of optical fibers. The draw furnace 14 may be oriented along a first pathway (A) such that an optical fiber 16 drawn from the optical fiber preform 12 exits the furnace along the first pathway (A). In the embodiments shown and described herein, the first pathway (A) is a substantially vertical pathway.

After the optical fiber 16 exits the draw furnace 14, the diameter of the optical fiber 16 and the draw tension applied to the optical fiber 16 may be measured using non-contact sensors 18, 20. As shown in FIG. 1, after the diameter and tension of the optical fiber 16 are measured, the optical fiber 16 may be optionally passed through a cooling mechanism 22 which expedites the solidification of the glass from which the optical fiber 16 is formed. The cooling mechanism 22 may be any mechanism for cooling an optical fiber as may be presently known in the art or subsequently developed. In one embodiment, the cooling mechanism 22 is filled with a gas that facilitates cooling of the optical fiber 16 at a rate faster than cooling the optical fiber 16 in air at ambient temperatures. However, as will be discussed further herein, other mechanisms may be used in conjunction with or in place of the cooling mechanism (e.g., the system 100 shown in FIG. 2) to facilitate cooling of the optical fiber.

As depicted in the embodiment of the system 10 shown in FIG. 1, after exiting the optional cooling mechanism 22, the optical fiber 16 is redirected from the first pathway (A) to a second pathway (B) where the optical fiber passes through at least one coating unit to receive a protective coating. The second pathway (B) is nonparallel with the first pathway (A) (e.g., if the first pathway (A) is substantially vertically oriented, the second pathway (B) is not identically oriented). For example, the second pathway (B) may be substantially perpendicular to the first pathway (A) such as when the second pathway (B) is substantially horizontal as depicted in FIG. 1. However, it will be understood that the second pathway (B) may be any pathway that is nonparallel with the first pathway (A).

It should be understood that, prior to receiving the protective coating, the optical fiber 16 is fragile and easily damaged, particularly when the uncoated optical fiber comes into mechanical contact with another solid. Accordingly, to maintain the quality of the optical fiber 16, it is imperative that contact between the optical fiber 16 and any solid surface or component be avoided prior to the optical fiber 16 receiving a protective coating. Therefore, to facilitate redirecting the optical fiber 16 without damaging the optical fiber 16, the optical fiber 16 may be routed through a non-contact mechanism which redirects the optical fiber 16 from the first pathway (A) to the second pathway (B) without mechanically contacting or touching the optical fiber 16. For example, referring now to FIGS. 1 and 2, in one embodiment, one or more fluid bearings 24 may be used to redirect the optical fiber 16 along various pathways such that the optical fiber 16 is not subject to mechanical contact until after the optical fiber 16 has been coated. The fluid bearings 24 may be of the type disclosed in U.S. Patent Provisional Application Ser. No. 60/861,587 entitled "METHODS FOR PRODUCING OPTICAL FIBERS," although various other types and configurations of fluid bearings may be used to facilitate non-contact redirection of an optical fiber as will be apparent to one skilled in the art.

Figure 3:
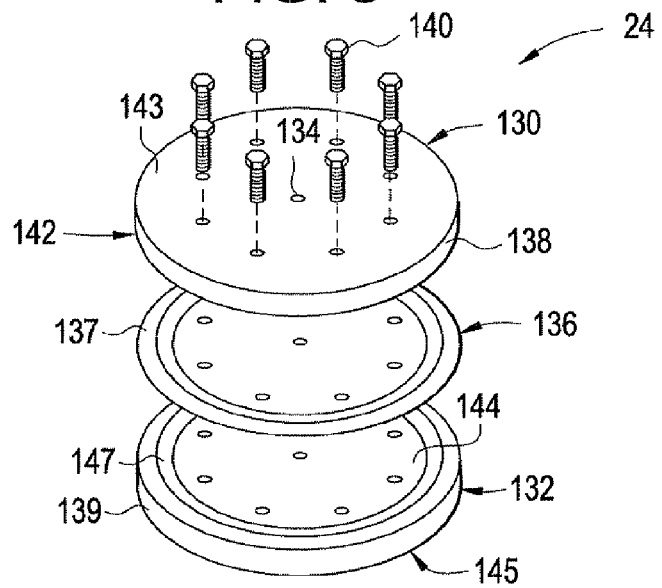
FIG. 3 is an exploded view of a fluid bearing for use in an optical fiber production system according to one or more embodiments shown and described herein.
Figure 4:
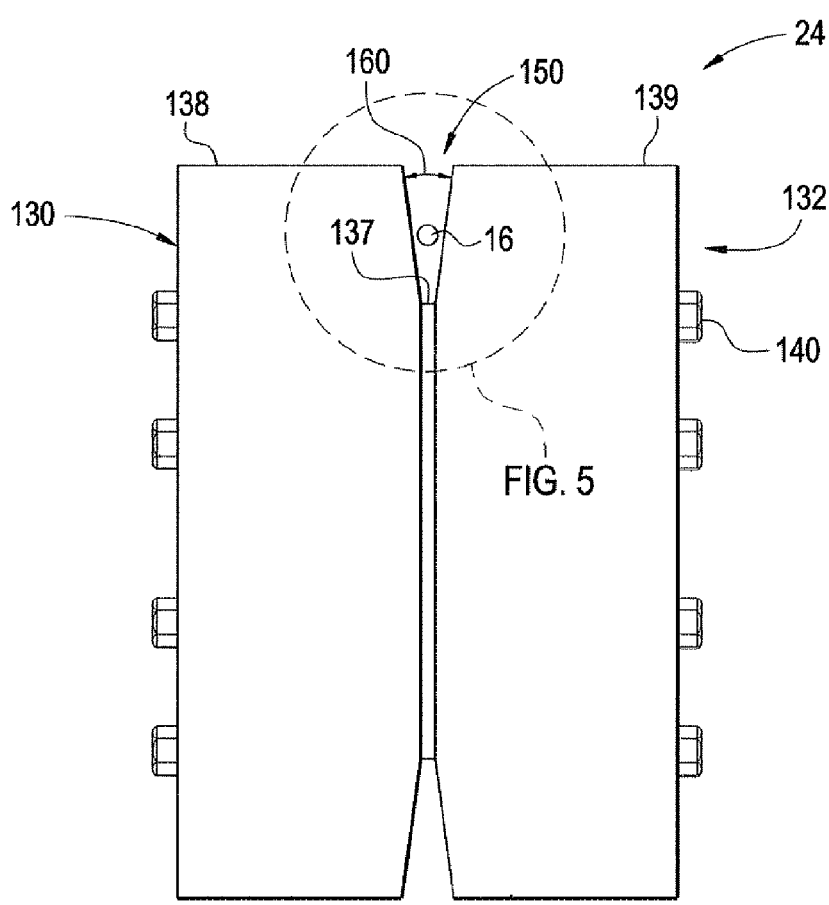
FIG. 4 is a side plan view of the fluid bearing for use in an optical fiber production system according to one or more embodiments shown and described herein.
Figure 5:
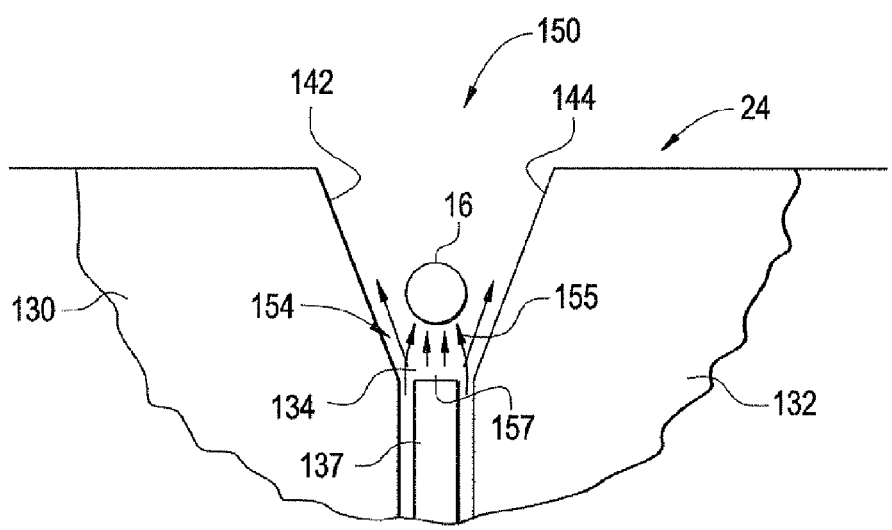
FIG. 5 is an enlarged view of a portion of the fluid bearing for use in an optical fiber production system shown in FIG. 4.

The fluid bearing(s) 24 that may be used with methods and systems described herein are illustrated in FIGS. 3-5 and may generally comprise a first plate 130, a second plate 132, an inner member 136 and at least one opening 134 in at least one of the first and second plates. The first plate 130 and the second plate 132 can be made of metal, glass, ceramics, plastics or any other suitable material, and include an arcuate outer surface 138, 139 and can be positioned on opposite sides of each other. The first plate 130 and the second plate 132 are connected by fasteners (e.g., bolts 140) to link the plates 130, 132 together so that fluid may be passed through the fluid bearing 24. The arcuate outer surfaces 138, 139 of each plate 130, 132 generally lie along the circumference of each of the respective plates 130, 132. The first plate 130 and the second plate 132 each have respective inner 142, 144 and outer surfaces 143, 145, wherein the inner faces 142, 144 of the plates 130, 132 are aligned with each other. A recessed portion 147 extends at least partially around the inner faces 142, 144 of either of the first plate 130 or the second plate 132 to provide a plenum for fluid flow.

The arcuate outer surfaces 138, 139 of the first plate 130 and the second plate 132 are preferably substantially aligned and form a fiber support channel 150 between the outer surfaces 138, 139 of both the first plate 130 and the second plate 132. The fiber support channel 150 is configured to receive an optical fiber 16 so that the optical fiber 16 can travel along this channel without rotation of the fluid bearing 24. At least one opening 134 passes through at least one of the first plate 130 and the second plate 132. As shown in FIG. 3, the opening 134 of the first plate 130 and the second plate 132 allows for fluid (e.g., air, helium or other gas or liquid) to be fed through the fluid bearing 24 so that the fluid can exit the fluid bearing 24 through the fiber support channel 150.

The fluid bearing 24 may include an inner member 136 positioned between the first plate 130 and the second plate 132. This inner member 136 (e.g., a shim 137) is configured to aid in directing the fluid to the channel between the outer surfaces 138, 139 of the first plate 130 and the second plate 132 such that the fluid exits the fiber support channel 150 having a predetermined flow direction. The inner member 136 rests between the first plate 130 and the second plate 132 to provide a gap there between. In addition, the inner member 136 serves as a sealing portion to provide a substantial contact between the first plate 130 and the second plate 132.

The fiber support channel 150 formed between the outer surfaces 138, 139 of the first plate 130 and the second plate 132 may be tapered where the fluid exits between the first plate 130 and the second plate 132. The opening 160 within the tapered fiber support channel 150 may be variable depending on where the optical fiber 16 is vertically positioned in the fiber support channel 150. Preferably, the opening 160 which forms the tapered fiber support channel 150 is configured so that, for the particular draw tensions and draw speeds employed and flow rates of the fluid through the opening 160, the optical fiber 16 is maintained in a section of the fiber support channel 150 which is less than 500 μm wide, more preferably less than 400 μm wide, even more preferably less than 300 μm wide, and most preferably less than 200 μm wide, for an optical fiber having a typical outer diameter of 150 μm. Thus the optical fiber 16 is preferably retained within a region of the fiber support channel 150 which is between 1 and 2 times the diameter of the optical fiber, more preferably between 1 and 1.75 times the diameter, and most preferably between 1 and 1.5 times the diameter of the optical fiber.

Referring now to FIG. 5, an enlarged view of a portion of FIG. 4 is shown to better illustrate the functionality of the fluid bearing 24. FIG. 5 depicts the fiber support channel 150 having a region of fluid cushion 155 that contacts the optical fiber 16 as it is transported across the fluid beating 24. The fluid cushion 155 prevents the optical fiber 16 from mechanically contacting the components of the fluid bearing 24. As depicted in FIG. 5, fluid 154 (e.g. air) may exit the fiber support channel 150 from within the fluid bearing 24 and around the optical fiber 16 thereby providing the region of fluid cushion 155 which the optical fiber 16 contacts. Fluid pressure may be optimized such that the fiber 16 is positioned within the fiber support channel 150 formed between the first plate 130 and the second plate 132 of the fluid bearing 24 so that the hydrodynamic force acting on the fiber 16 is directly to the center of the channel 150, preventing the fiber 16 from contacting the walls 130 and 132. Particularly, the fluid 154 exiting the fluid bearing 24 through the fiber support channel 150 can have a constant fluid flow rate which can maintain or support the optical fiber 16 at a certain position within the fiber support channel 150. The hydrostatic pressure creates a region of fluid cushion 155 as a result of the pressure differential between the fiber and the plates 130, 132. A high enough fluid pressure is provided to the fiber support channel 150 to support the optical fiber 16 and maintain the optical fiber 16 at a desired location within the fiber support channel 150 as the optical fiber 16 moves through the fluid bearing assembly 1 16. Accordingly, the fluid bearing 24 facilitates redirecting the optical fiber 16 without mechanically contacting the optical fiber 16.

While specific reference has been made herein to the use of fluid bearings for redirecting the optical fiber 16 from a first pathway (A) to a second pathway (B), it should be understood that other devices suitable for redirecting an optical fiber without damaging the optical fiber may be used in place of a fluid bearing and, unless otherwise indicated, no particular limitation is intended with respect to the manner or apparatus used to redirect the optical fiber 16 from the first pathway (A) to the second pathway (B).

Referring again to FIGS. 1 and 2, the system 10 for producing coated optical fibers may comprise a single fluid bearing 24 for redirecting the optical fiber 16 from the first pathway (A) to the second pathway (B) as shown in FIG. 1. Alternatively, a plurality of fluid bearings 24 may be used to redirect the optical fiber 16 from the first pathway (A) to the second pathway (3) as in the embodiment of the system I 00 for producing coated optical fiber shown in FIG. 2 wherein three fluid bearings 24 are used to redirect the optical fiber 16 from the first pathway (A) to the second pathway (B). Accordingly, it will be understood that the optical fiber 16 may be redirected along one or more intermediate pathways between the first pathway (A) and the second pathway (B) and that the intermediate pathways may be of any orientation with respect to the first pathway (A) and the second pathway (B).

Figure 2:
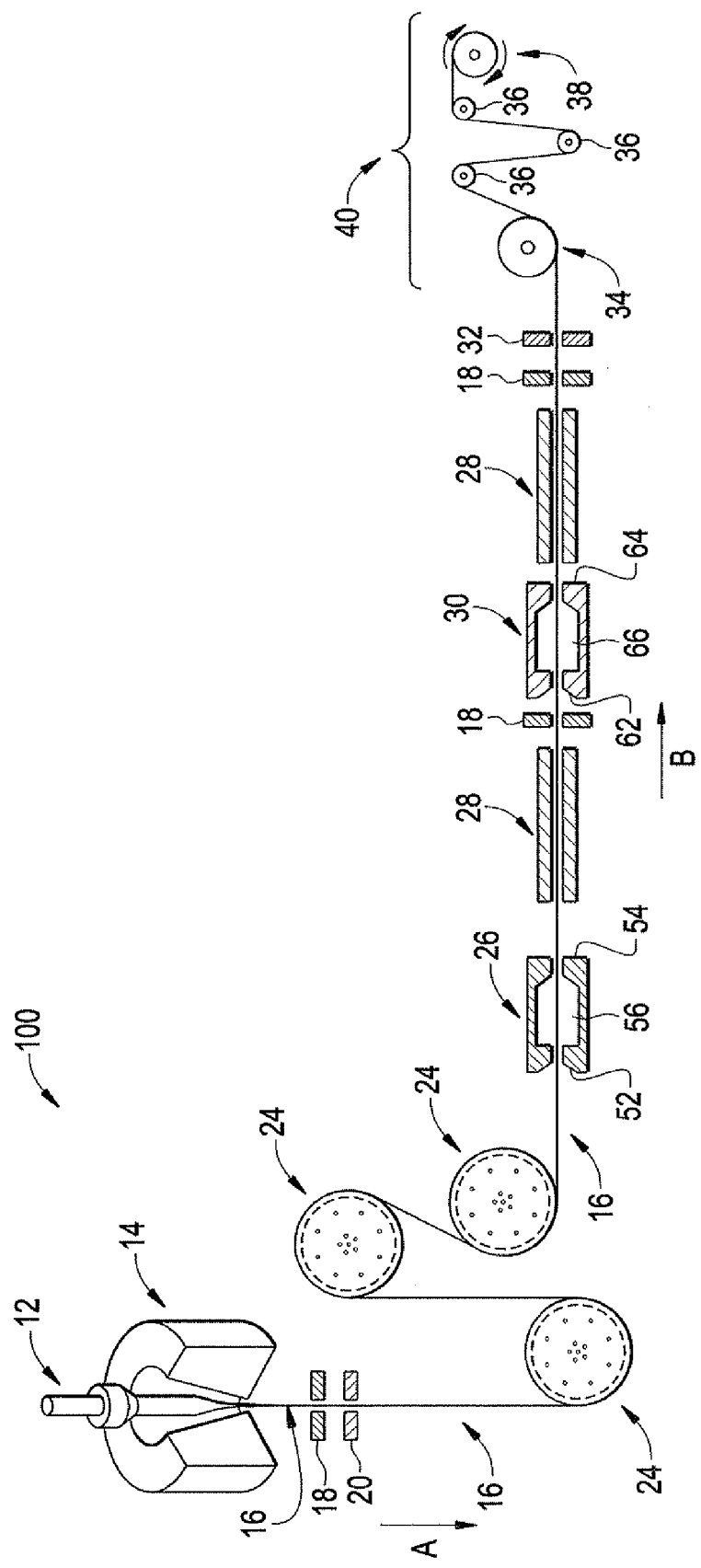
FIG. 2 is a schematic illustration of an optical fiber production system according to one or more embodiments shown and described herein.

Further, it will be understood that, while the fluid bearings 24 depicted in FIGS. 1 and 2 function to redirect the optical fiber 16 from one pathway to another, the fluid bearings 24 may also operate as a cooling mechanism for cooling the optical fiber 16 after the optical fiber 16 exits the draw furnace 14. More specifically, the fluid cushion and associated fluid stream that supports the optical fiber 16 in the fluid bearing 24 may also serve to carry heat away from the optical fiber 16 thereby cooling the optical fiber 16. The fluid bearings 24 may work in conjunction with a cooling mechanism 22 to cool the optical fiber 16, as in the embodiment of the system 10 for producing a coated optical fiber depicted in FIG. 1. Alternatively, one or more fluid bearings 24 may be used in place of a cooling mechanism 22 to achieve cooling of the optical fiber 16 as in the embodiment of the system 100 for producing a coated optical fiber depicted in FIG. 2.

Still referring to FIGS. 1 and 2, after the optical fiber 16 has been redirected by the fluid bearing(s) 24 from the first pathway (A) to the second pathway (B), the optical fiber 16 enters a first coating die 26 where a first coating is applied to the optical fiber 16. The first coating die 26 is oriented along the second pathway (B) such that the optical fiber 16 enters and exits the first coating die 26 along the second pathway (B). As shown in FIGS. 1 and 2, the second pathway (B) is a substantially horizontal pathway and, accordingly, the first coating die 26 has a substantially horizontal orientation. However, it should be understood that, while FIGS. 1 and 2 depict the first coating die 26 as having a substantially horizontal orientation, the first coating die 26 will generally have the same orientation as the second pathway (B). Accordingly, the first coating die 26 may have any orientation such that the first coating die 26 has a nonparallel orientation with the first pathway (A).

The first coating die 26 may be configured to apply a polymeric coating to the optical fiber 16. The polymeric coating may enhance the optical properties of the optical fiber 16 and also protects the optical fiber 16 from damage. The polymeric coating may be an ultra violet light-curable coating (UV curable coating) such as one or more urethane acrylate based coatings. To facilitate coating the optical fiber 16, the first coating die 26 may comprise a guide die 52 having a first diameter and a sizing die 54 having a second, smaller diameter. Disposed between the guide die 52 and the sizing die 54 is a coating chamber 56. The coating chamber 56 is filled with the polymeric coating material in liquid form. The optical fiber 16 enters the first coating die 26 through the guide die 52 and passes through the coating chamber 56 where the coating is applied to the surface of the optical fiber 16. The optical fiber 16 then passes through the sizing die 54 where any excess polymer coating is removed as the optical fiber 16 exits the first coating die 26 to achieve a coated optical fiber of a specified diameter corresponding to the diameter of the sizing die 54.

It should be understood that the first coating die 26 may be configured to apply any type of material suitable for coating an optical fiber and thereby enhancing the optical properties of the optical fiber 16 and/or for protecting the optical fiber 16 including, without limitation, UV curable polymers and thermoplastics. Further, while FIGS. 1 and 2 depict a first coating die 26 having a guide die 52, a coating chamber 56 and sizing die 54, it should be understood that the first coating die 26 may be any suitable coating die for applying a coating to an optical fiber as may be presently known in the art or subsequently developed. For example, the first coating die 26 may be an extrusion die for applying a thermoplastic material to the optical fiber 16. The first coating die 26 may also be configured to apply more than one coating to the optical fiber 16.

In one embodiment, such as when wet-on-dry coating techniques are used, after the optical fiber 16 exits the first coating die 26, the optical fiber 16 may pass through an optional curing unit 28 as shown in FIGS. 1 and 2. The curing unit 28 may be oriented along the second pathway (B) such that the optical fiber 16 enters and exits the curing unit 28 along the second pathway (B). The curing unit 28 functions to solidify or harden the coating(s) applied to the optical fiber 16 in the first coating die 26. For example, when the coating applied in the first coating die 26 is a UV curable coating, the curing unit 28 may comprise a bank of UV irradiators which function to solidify and harden the coating on the optical fiber 16. Alternatively, when the coating applied in the first coating die 26 is a thermoplastic, the curing unit 28 may comprise a cooling unit for cooling and solidifying the coating on the optical fiber 16. Accordingly, the coating applied to the optical fiber 16 in the first coating unit 26 is substantially hardened or solidified before the optical fiber 16 travels to the next stage of production.

Alternatively, in another embodiment (not shown), such as when wet-on-wet coating techniques are used, the optical fiber 16 enters the next stage of production without passing through a curing unit. As such, the coated optical fiber 16 enters the next stage of production with the coating wet or substantially in the liquid phase.

Once the optical fiber 16 leaves the optional curing unit 28, the diameter of the coated optical fiber may be measured by a non-contact sensor 18 before the optical fiber 16 travels to subsequent processing stages (not shown).

Thereafter, the optical fiber 16 may enter a second coating die 30 where a second coating is applied to the optical fiber 16. The second coating die 30 is oriented along the second pathway (B) such that the optical fiber 16 enters and exits the second coating die 30 along the second pathway (B). As shown in FIGS. 1 and 2, the second pathway (B) is a substantially horizontal pathway and, accordingly, the second coating die 30 has a substantially horizontal orientation. However, it should be understood that, while FIGS. 1 and 2 depict the second coating die 30 as having a substantially horizontal orientation, the second coating die 30 will generally have the same orientation as the second pathway (B). Accordingly, the second coating die 30 may have any orientation such that the second coating die 30 has a nonparallel orientation with the first pathway (A).

The second coating die 30 may be configured similar to the first coating die 26 with a guide die 62, a coating chamber 66 and a sizing die 64 such that a UV curable coating may be applied to the optical fiber 16 in the second coating die as is shown in FIGS. 1 and 2. However, it should be understood that the second coating die 30 may be configured to apply any type of material suitable for coating an optical fiber and thereby enhancing the optical properties of the optical fiber 16 and/or for protecting the optical fiber 16 including, without limitation, UV curable polymers and thermoplastics. It should also be understood that the second coating die 30 may be any suitable coating die for applying a coating to an optical fiber as may be presently known in the art or subsequently developed. Further, the second coating die 30 may be configured to apply more than one coating to the optical fiber 16.

It should be understood that the optical fiber may be coated using wet-on-dry coating techniques and/or wet-on-wet coating techniques. When wet-on-dry coating techniques are utilized, the optical fiber is passed through a curing unit which dries, hardens, and solidifies the previously applied coating before a subsequent coating is applied. When wet-on-wet coating techniques are used, the optical fiber may be coated with a subsequent coating while the first coating is in a substantially liquid or wet state.

After exiting the second coating die 30 the optical fiber enters a second curing unit 29 where the coating(s) applied to the optical fiber 16 in the second coating die 30 are cured. Where the coating techniques utilized to coat the optical fiber are wet-on-wet techniques, the second curing unit 29 may also function to cure both the first coating applied to the optical fiber 16 in the first coating unit 26 and the second coating applied to the optical fiber 16 in the second coating unit 30. The second curing unit 29 may comprise a bank of UV irradiators or a cooling system depending on the type of coating applied to the optical fiber 16 in the second coating die 30.

Following the second curing unit 29, the diameter of the coated optical fiber 16 is measured again using a non-contact sensor 18. Thereafter, a non-contact flaw detector 32 is used to examine the coated optical fiber 16 for damage and/or flaws that may have occurred during the manufacture of the optical fiber 16. The optical fiber 16 may travel through a number of other processing stages (not shown) within the system 10, 100 after the optical fiber 16 has been coated. It should be understood that, after the optical fiber 16 has been coated, the optical fiber 16 is less susceptible to damage due to mechanical contact. Accordingly, in subsequent processing stages (not shown) mechanical contact with the optical fiber 16 may be acceptable.

As shown in FIGS. 1 and 2, a fiber take-up mechanism 40 utilizes drawing mechanisms 36 and pulleys 34 to provide the necessary tension to the optical fiber 16 as the optical fiber is drawn through the system 10, 100. After processing and manufacture of the optical fiber 16 is complete, the optical fiber 16 is wound on to a storage spool 38.

It should now be understood that the methods and systems described herein provide for the manufacture of coated optical fibers utilizing non-vertically oriented coating dies. Coating the optical fiber along non-vertical pathways may be facilitated, at least in part, through the use of non-contact fluid bearings which permit the optical fiber to be redirected along various pathways without mechanically touching the optical fiber. Accordingly, the potential for damage to the optical fiber as the fiber is being redirected is reduced or eliminated. The coatings applied to the optical fiber along the non-vertical pathways may comprise UV curable polymeric coatings, thermoplastic coatings, and/or combinations thereof as will be apparent to one skilled in the art.

Moreover, the methods and systems described herein facilitate orienting optical fiber production systems along non-vertical pathways thereby reducing the overall height of the optical fiber production system. More specifically, the methods and systems described herein facilitate optical fiber production systems in which the system stretches horizontally rather than vertically providing for a more efficient use of building space in facilities housing the optical fiber production system and improves the ease with which modifications and repairs may be made to the system. Further, having the optical fiber production system oriented at least partially horizontal rather than vertical significantly reduces the costs of implementing modifications, updates and repairs of the optical fiber production system which, in turn, reduces the cost of manufacturing optical fiber.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method of producing a coated optical fiber, the method comprising:
    drawing an optical fiber from a draw furnace along a first pathway;
    redirecting the optical fiber through a fluid bearing to a second pathway, the fluid bearing comprising a channel defined by two side walls, said fiber retained between said two side walls in a fluid cushion during said redirecting step, wherein the second pathway is non-parallel with the first pathway; and
    coating the optical fiber as the optical fiber travels along the second pathway.

2. The method of claim 1 wherein coating the optical fiber comprises applying a first coating to the optical fiber and applying a second coating to the optical fiber.

3. The method of claim 2 wherein coating the optical fiber further comprises curing each coating before a subsequent coating is applied to the optical fiber.

4. The method of claim 1 wherein coating the optical fiber comprises applying a UV curable coating to the optical fiber and applying a UV curable coating or a thermoplastic coating to the optical fiber.

5. The method of claim 1 wherein coating the optical fiber comprises:
    passing the optical fiber through at least one coating die thereby coating the optical fiber, wherein the at least one coating die is oriented such that the optical fiber enters and exits the at least one coating die along the second pathway.

6. The method of claim 1 wherein coating the optical fiber comprises applying a first coating to the optical fiber by passing the optical fiber through a first coating die and applying a second coating to the optical fiber by passing the optical fiber through a second coating die, wherein the first coating die and the second coating die are oriented such that the optical fiber enters and exits each coating die along the second pathway.

7. The method of claim 1 wherein the first pathway is substantially vertical.

8. The method of claim 1 wherein the second pathway is substantially horizontal.

9. The method of claim 1 wherein the two side walls which define said channel are tapered with respect to one another.

10. A method of producing a coated optical fiber, the method comprising:
    drawing an optical fiber from an optical fiber preform along a substantially vertical pathway;
    redirecting the optical fiber through a fluid bearing to a substantially horizontal pathway, the fluid bearing comprising a channel defined by two side walls, said fiber retained between said two side walls in a fluid cushion during said redirecting step; and
    passing the optical fiber through at least one coating die thereby coating the optical fiber, wherein the at least one coating die is oriented such that the optical fiber enters and exits the at least one coating die along the substantially horizontal pathway.

11. The method of claim 10 wherein coating the optical fiber comprises applying a UV curable coating, a thermoplastic coating or both.

12. The method of claim 10 wherein the at least one coating die comprises a first coating die and a second coating die; and
    the method further comprises passing the optical fiber through the first coating die to apply a first coating to the optical fiber and passing the optical fiber through the second coating die to apply a second coating to the optical fiber, wherein the first coating die and second coating die are oriented such that the optical fiber enters and exits each coating die along the substantially horizontal pathway.

13. The method of claim 12 further comprising curing each coating before a subsequent coating is applied to the fiber.

14. The method of claim 12 wherein applying the first coating comprises applying a UV curable coating to the optical fiber and applying the second coating comprises applying a UV curable coating or a thermoplastic plastic coating to the optical fiber.

* * * * *